United States Patent [19]
Cantrell et al.

[11] Patent Number: 4,952,793
[45] Date of Patent: Aug. 28, 1990

[54] CIRCUIT FOR GATING AN IMAGE INTENSIFIER

[75] Inventors: Clifford B. Cantrell, North Garden; Lawrence H. Gilligan, Charlottesville, both of Va.

[73] Assignee: Sperry Marine Inc., Charlottesville, Va.

[21] Appl. No.: 338,805

[22] Filed: Apr. 14, 1989

[51] Int. Cl.$^5$ .............................................. H01J 31/50
[52] U.S. Cl. ............................ 250/213 VT; 250/551; 313/529
[58] Field of Search ............ 250/213 R, 213 VT, 551; 313/529, 537

[56] References Cited

U.S. PATENT DOCUMENTS 4,328,418  5/1982  Morgan ................................ 313/529
4,882,481 11/1989  Gilligan ........................ 250/213 VT Primary Examiner—David C. Nelms
Assistant Examiner—Sherrie Hsia
Attorney, Agent, or Firm—Seymour Levine

[57] ABSTRACT

The gating circuit includes a low voltage section and a high voltage section with a fast and a slow switch in the high voltage section for providing the gating pulses to the photocathode (PC) of the image intensifier. A high voltage isolated DC/DC power supply referenced to the MCPin terminal of the integral wrap around power supply of the image intensifier provides, to the fast and slow switches, positive and negative potentials referenced to MCPin. The negative potential is sufficient to turn the PC on and the positive potential is sufficient to turn the PC off and to clear burned in PC images. The high voltage isolated power supply provides high voltage isolation between the low voltage section and the reference input and outputs thereof in the high voltage section. A driver included in the high voltage section for driving the fast switch receives operating potentials from a low voltage isolated DC/DC power supply referenced to the high voltage supply. The elements of the driver therefore only experience low voltages thereacross. High speed gating pulses and low speed gating pulses are conveyed between the low voltage section and the high voltage section across respective high and low speed isolation barriers to drive the fast and slow switches, respectively. The high speed barrier comprises a high voltage capacitor and the low speed barrier comprises an opto-isolator. The high speed pulses include narrow, low repetition rate pulses for clearing burned in images from the PC.

9 Claims, 2 Drawing Sheets

CIRCUIT FOR GATING AN IMAGE INTENSIFIER

BACKGROUND OF THE INVENTION

1. Field of the Invention

The invention relates to image intensifiers, particularly with respect to second generation and above gated image intensifiers having a microchannel plate with a high voltage microchannel plate input (MCPin). The invention is particularly concerned with gating the photocathode (PC) of the image intensifier over a wide dynamic range.

2. Description of the Prior Art

The prior art has contemplated the use of a gated image intensifier as an electronic shutter. Voltages applied to the photocathode thereof are varied to switch the photocathode on and off. Utilizing the gated photocathode of an image intensifier advantageously provides significantly faster shutter speeds compared to traditional mechanical shutters. At best, the minimum shutter open time for a mechanical shutter is on the order of 100 microseconds. The shutter speed for a gated image intensifier is limited by the propagation time of the charge across the area of the photocathode. For a typical second generation, microchannel plate, 18 millimeter photocathode, image intensifier, the limiting shutter speed is less than 15 nanoseconds. Shutter speeds of this order of magnitude are desirably utilized to stop action in high speed event imaging. For example, travelling projectiles, such as bullets, can be stopped in mid flight. Events such as explosions and plasma flows can be stopped and observed on a stationary frame.

The gated image intensifier may utilize the gate as a light level control by providing a variable gate time. An all light level television camera system utilizes the video output from an intensified camera to pulse width modulate (PWM) the gate of the image intensifier to provide eight orders to magnitude of light level control dynamic range. Such a system is described in the *Proceedings of the SPIE*, Volume 832, "Dual Mode Auto-Light Control for Low Light Television" by L. H. Gilligan and D. W. Gerdt, Page 307. Additionally, a paper in the *Proceedings of the SPIE*, Volume 693, "Auto-Light Control by Pulse Width Modulation" by L. H. Gilligan and D. W. Gerdt, Page 53 also discloses such a system. Further details of such systems may also be found in U.S. Pat. No. 4,202,014, issued May 6, 1980, entitled "Pulse Modulated Automatic Light Control" by Gilligan and Hermansdorfer and in U.S. patent application Ser. No. 259,829, filed Oct. 19, 1988, entitled "Automatic Brightness Control for Image Intensifiers" by Gilligan and Gerdt. Said U.S. Pat. No. 4,202,014 and U.S. application No. 259,829 are assigned to the assignee of the present invention.

Many other applications exist for a gated image intensifier. For example, a range gated intensified television camera may be utilized for penetration of atmospheric obscurants such as fog and smoke. Such a system is disclosed in U.S. Patent Application No. 288,549, filed Dec. 22, 1988, entitled "Atmospheric Obscurant Penetration Target Observation System with Range Gating" by Gilligan and Gerdt. Said Ser. No. 288,549 is assigned to the assignee of the present invention.

Although gating circuits exit in the prior art for gating the photocathode of such gateable image intensifiers, the circuits suffer from numerous disadvantages. Such circuits tend to exhibit low reliability and narrow dynamic range as well as tending to be excessively expensive. These disadvantages accrue because the photocathode (PC) voltage that gates the intensifier on is approximately 80 volts more negative than the microchannel plate input voltage which is typically at a potential of −800 VDC. The gating pulse applied to the PC to gate the photocathode on and off is therefore difficult to generate. The prior art gating circuits utilize very high voltage switching components to gate the photocathode, which components tend to be excessively expensive. Another problem of prior art circuits is the provision of sufficient peak current to charge the PC intrinsic capacitance quickly enough to provide short rise and fall times. Additionally, in order to accommodate the wide dynamic range desired for such all light level television cameras and to provide adequate protection to the image intensifier from excessive light input, gating pulses ranging from 100 nanoseconds through the microsecond and millisecond range to DC should be utilized. The prior art gating circuits do not have the capability of generating sufficiently short pulses to compensate for very high light levels while providing for long on times such as tens of milliseconds or continuous operation for low light levels. Different types of drive circuitry are required for fast nanosecond pulses than for slow rise and fall time millisecond range pulses and for DC operation. Thus, the prior art gating circuits tended to be limited in dynamic range.

Another problem encountered in present day image intensifiers is that if elements of excessive brightness are viewed in a dark scene, photocathode damage may result by the scene tending to "burn in" to the photocathode. Thus, image intensifiers tend to burn in images that are too bright. For example, if the intra-scene dynamic range is too large; e.g., a runway light on a dark runway at night, the bright spot from the light forms a negative image on the photocathode that does not dissipate when power is removed. The burned in images obscure subsequent images and accumulate until the image intensifier picture is no longer useable. This type of damage tends to be reversible if it is not too extreme. It is believed that the damage is caused by impurity ions, generally potassium, transferred from the microchannel plate to the photocathode. resulting in regions of low sensitivity corresponding to the bright regions of the scene. If the damage caused by the damage event is reversible, ion diffusion in the photocathode will obscure or negate the damage over a long period of time. It has been observed that the immediate application of the photocathode of a sufficiently large reverse off potential repairs the ion damage in a relatively short period of time. This problem is discussed in said SPIE paper, volume 832, as well as in said Ser. No. 259,829. The prior photocathode gating circuits do not include means for repairing such damage.

SUMMARY OF THE INVENTION

The present invention provides an inexpensive, high reliability, wide dynamic range gating circuit for an image intensifier. The gating circuit also provides voltages for clearing burned in images from the intensifier. The gating circuit comprises a high voltage section and a low voltage section. A first isolated power supply provides a positive and a negative DC potential with respect to a reference input. The negative potential is sufficiently offset from the reference input to provide the required photocathode turn on voltage. The positive potential is sufficiently offset from the reference to turn the photocathode off and provide a photocathode repair potential. The reference is coupled to the MCPin supply from the image intensifier to provide the appropriate offset voltage to the first power supply. The first isolated power supply provides an isolation barrier between the high voltages provided thereby in the high voltage section and a low voltage power source in the low voltage section. The outputs from the first power supply are applied to a fast switch and a slow switch in the high voltage section. The outputs of the fast switch and slow switch are combined to provide the switching voltages to the PC. High speed and low speed gating pulses from the low voltage section are applied across respective isolation barriers to the high voltage section to drive the fast and slow switches, respectively. Driving circuitry in the high voltage section is responsive to the gating pulses across the isolation barrier for actuating one or both of the switches. A second isolated power supply provides operating voltages to the components of the driver circuitry. The second power supply is referenced to the first power supply so that the components of the driver circuitry only experience low voltages thereacross. The second isolated power supply isolates the operating voltages for the driver circuitry from the low voltage power in the low voltage section.

DESCRIPTION OF THE PREFERRED EMBODIMENT

Figure 1:
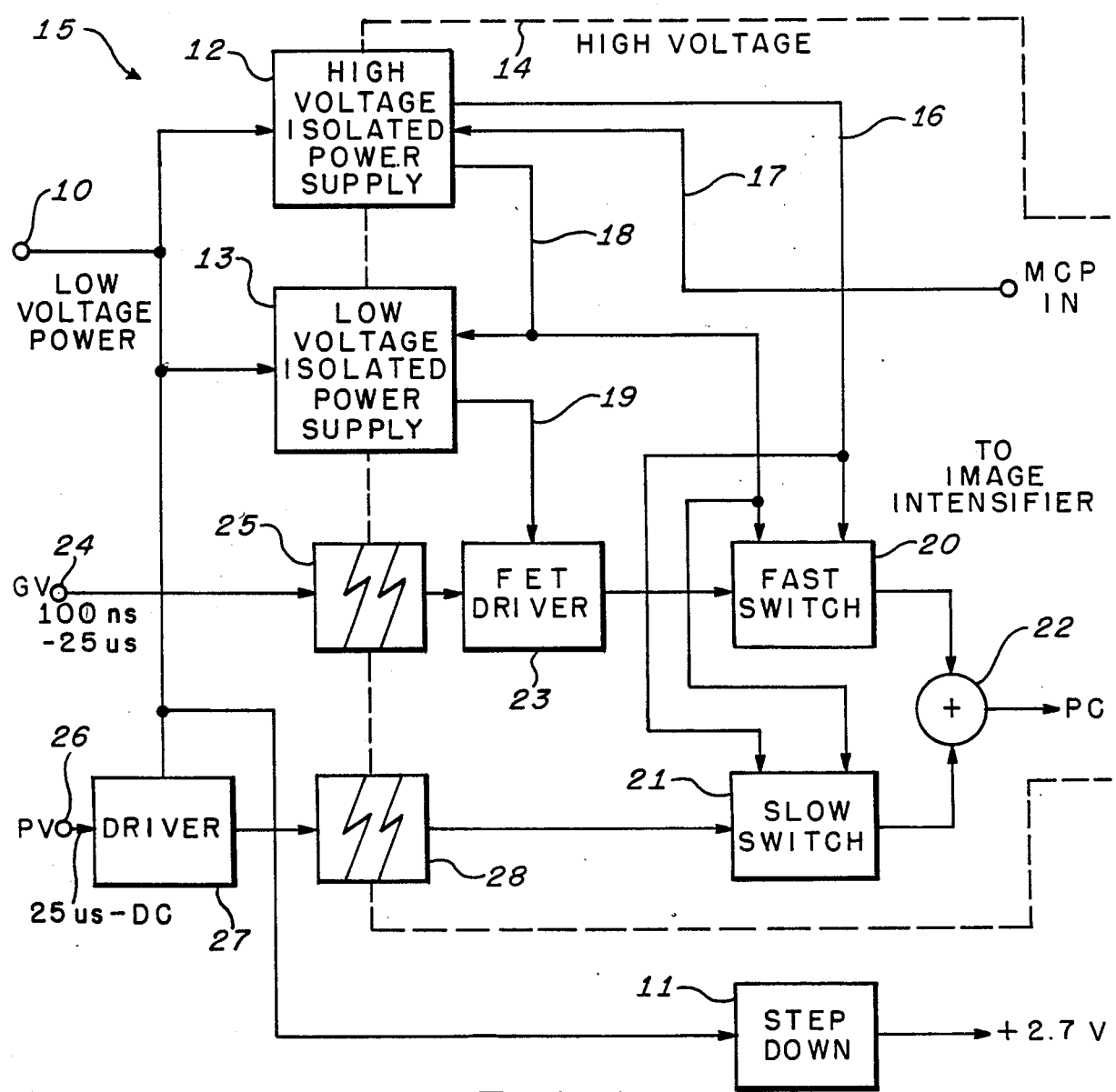
FIG. 1 is a schematic block diagram of the image intensifier photocathode gating circuit implemented in accordance with the present invention.
Figure 2:
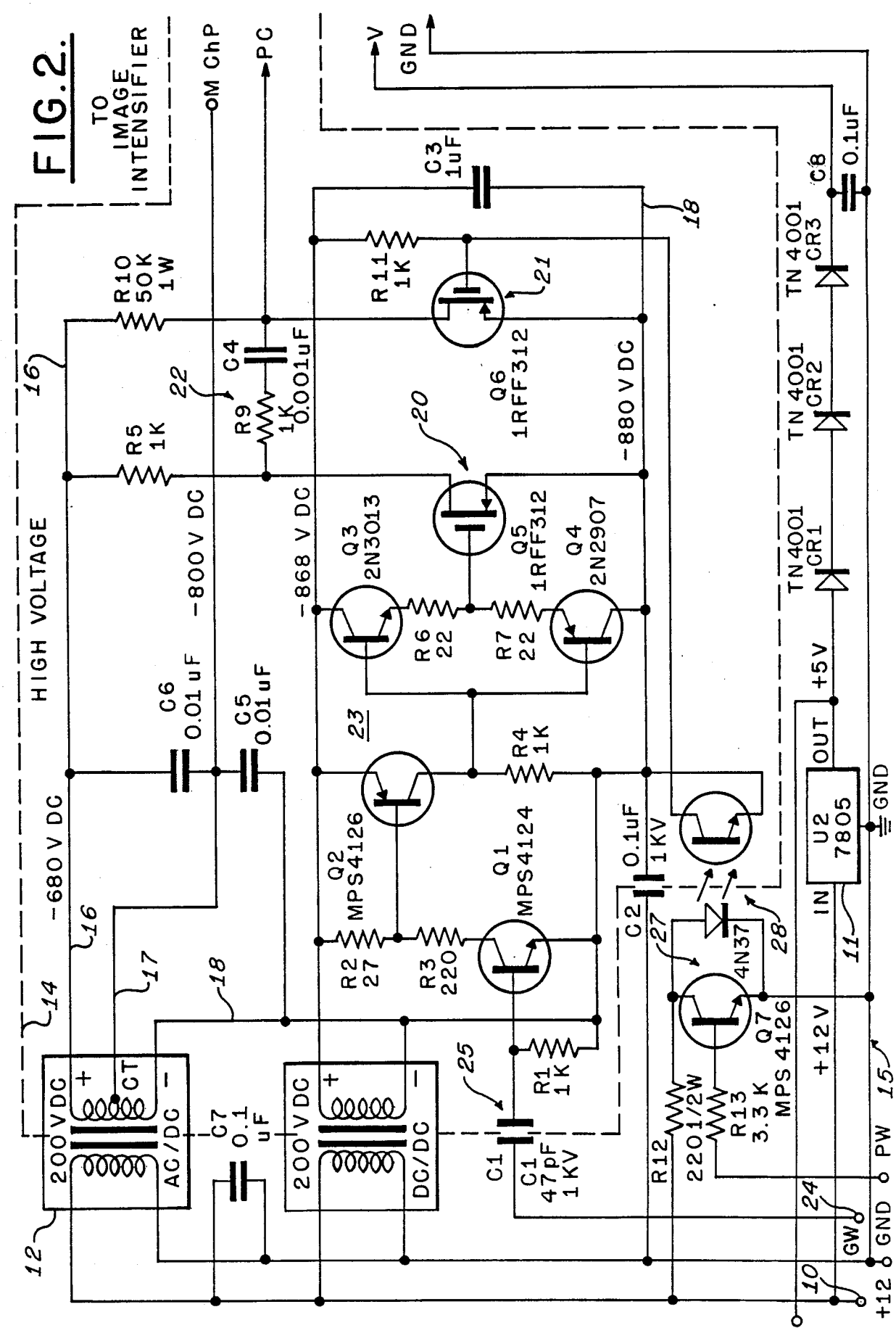
FIG. 2 is a schematic wiring diagram illustrating details of the circuit of FIG. 1.

Referring to FIGS. 1 and 2, a block diagram and a schematic wiring diagram of the circuit in accordance with the present invention for gating the PC of an image intensifier are illustrated, respectively. The image intensifier preferably has a wrap around power supply that is integral therewith. Low voltage power, such as +12 VDC, is applied at a terminal 10 to the gating circuit. The low voltage power at the terminal 10 is applied through a voltage step down device 11 to provide the intensifier primary power of +2.7 VDC to the wrap around supply of the image intensifier. The low voltage power at the terminal 10 is also utilized as the input to two separate isolated DC/DC power supplies 12 and 13. The supplies 12 and 13 provide greater than 1,000 VDC input to output isolation. The switching circuit of FIGS. 1 and 2 is comprised of a high voltage section 14 and a low voltage section 15. The supply 12 is a high voltage isolated power supply that provides a +120 VDC output 16 and a −80 VDC reference 18. The supply 12 also provides a 0 VDC output 17. All voltages are expressed relative to the reference 17. The voltage reference 17 is coupled to the MCPin terminal of the image intensifier therefore being fed by the intensifier integral wrap around power supply. Thus, the MCPin voltage of the intensifier provides the voltage reference for the high voltage isolated power supply 12. Typically, the MCPin supply of the image intensifier is −800 VDC such that the output 16 of the supply 12 is at −680 VDC relative to ground and the output 18 of the supply 12 is at −880 VDC relative to ground.

The supply 13 is a low voltage isolated power supply that provides +12 VDC at an output 19 relative to a second output thereof to which the output 18 from the high voltage supply 12 is coupled. Thus, the low voltage supply 13 is referenced to the most negative terminal 18 of the high voltage supply 12 and therefore provides −868 VDC relative to ground at the output 19.

The high voltage section 14 includes a fast switch 20 and a slow switch 21. The outputs of the fast switch 20 and slow switch 21 are summed in a combining device 22 to provide the gating pulses to the intensifier PC. The fast switch 20 is driven by a high speed FET driver circuit 23 which utilizes the output 19 from the low voltage supply 13 for its power. High speed gate pulses in the range of less than 100 nanoseconds to 25 microseconds are applied to a GW input 24. The high speed pulses applied at the GW input 24 are transmitted to the high voltage section 14 over a high speed isolation barrier 25. The high speed pulses transmitted through the isolation barrier 25 are applied to the driver circuit 23 to operate the fast switch 20. The fast switch 20 generates pulses from −680 VDC to −880 VDC that are of the same duration as the input high speed pulses. The pulses from the switch 20 are applied through the combining device 22 to the PC of the image intensifier. The level −680 VDC is the intensifier off potential and the level −880 VDC is the intensifier on potential.

Low speed pulses in the range of 25 microseconds to DC are applied to a PW input 26. The low speed pulses at the PW input are applied to a low speed driver 27 and through a low speed isolation barrier 28 to the high voltage section 14. The low speed pulses transmitted through the isolation barrier 28 are applied to the slow switch 21 to produce pulses from −680 VDC to −880 VDC that are of the same duration as the input pulses applied to the terminal 26. The PW input may also be DC at which time the image intensifier will be on continuously.

It is appreciated that the isolation barriers 25 and 28 provide signal isolation between the circuitry providing the logic level pulses to the GW and PW inputs and the high voltages existing in the high voltage section 14. Thus, the circuit of the present invention utilizes two pulse ranges, isolated supplies and isolation barriers to accomplish the PC gating.

With continued reference to FIG. 2, in which like reference numerals indicate like components with respect to FIG. 1, a schematic wiring diagram for the gating circuit of FIG. 1 is illustrated. The component types and values utilized in the circuit are illustrated. The values of the resistors are in ohms and ¼ watt resistors are utilized unless otherwise indicated. Field Effect Transistors Q5 and Q6 are utilized as the high speed and low speed switches 20 and 21, respectively. The high speed isolation barrier 25 is a high voltage capacitor C1 and the low speed isolation barrier 28 is an opto-isolator U1. It is appreciated that a further high voltage capacitor C2 is utilized as a return path isolation barrier for the high speed switch 20 as well as for the high speed driver 23.

Thus, the high voltage capacitor C1 transmits the high speed pulses from the low voltage section 15 to the high voltage section 14 across the barrier 25. The opto-isolator U1 transmits the low speed pulses as well as DC across the barrier 28 from the low voltage section 15 to the high voltage section 14. The intensifier primary power of +2.7 VDC is provided by the step down device 11 implemented as a three port regulator. The output voltage of +5 VDC from step down device 11 is reduced to the requisite +2.7 VDC by the diode drops across CR1-CR3. The diodes CR1-CR3 also provide reverse voltage protection to the step down device 11.

It is appreciated that all of the components of the driver 23 are referenced between −868 VDC and −880 VDC and therefore do not experience more than 12 VDC thereacross. Thus, low voltage inexpensive logic level components may be utilized to implement the present invention rather than expensive high voltage elements. Similarly, although the switches 20 and 21 are referenced to −800 VDC from the MCPin from the image intensifier, only 200 VDC are applied thereacross for generating the gating pulses and again relatively low cost components may be utilized.

In order to clear burned in images by repairing ion damage, a series of 100 nanosecond pulses are applied to the GW input, spaced 16.6 milliseconds apart. This generates a series of pulses on the gate of the image intensifier from −680 VDC to −880 VDC. This series of short pulses is effective to remove the burned in obscurations. The time required to remove a burned in image is directly proportional to the time the image had previously existed. Repair of the photocathode with respect to burned in images is further discussed in said Ser. No. 259,829.

Figure 3:
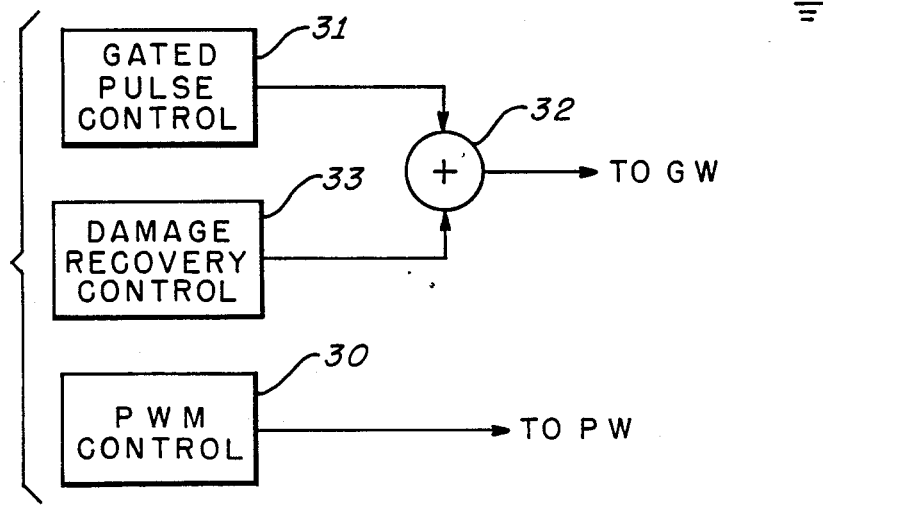
FIG. 3 is a schematic block diagram exemplifying input sources for the gating circuit of FIGS. 1 and 2.

Referring to FIG. 3, circuitry for providing appropriate signals to the GW and PW inputs is exemplified. A pulse width modulation control 30 is illustrated to provide the low speed pulses to the PW input 26. The low speed pulses may comprise signals that are pulse width modulated (PWM) so as to provide automatic light level control as described in said SPIE paper, volume 832, as well as in said Pat. No. 4,202,014 and said Ser. No. 259,829. A gated pulse control 31 is illustrated to provide high speed pulses to the GW input 24 for, for example, either further dynamic range PWM or shuttering purposes as described above. The high speed pulses from the gated pulse control 31 are provided to the GW input through a combining device 32. The 100 nanosecond pulses described above for PC damage recovery are provided from a damage recovery control circuit 33 applied to the GW input through the combining device 32.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. Apparatus for providing photocathode (PC) gating signals to the photocathode of an image intensifier having a microchannel plate input (MCPin) requiring a high negative MCPin potential for operation, said PC requiring a PC turn on potential more negative than said MCPin potential and a PC turn off potential more positive than said MCPin potential, comprising
   a low voltage section and a high voltage section,
   high voltage isolated power supply means having a positive output, a negative output, and a reference input in said high voltage section, said positive output and negative output providing positive and negative potentials, respectively, with respect to said reference input, said high voltage isolated power supply means providing high voltage isolation between said low voltage section and said positive and negative outputs and said reference input, said reference input being coupled to said MCPin potential so that said negative potential provides said PC turn on potential and said positive potential provides said PC turn off potential,
   a source of gating pulses in said low voltage section,
   isolation barrier means for conveying said gating pulses from said low voltage section to said high voltage section, and
   switch means in said high voltage section responsive to said positive and negative potentials for providing said PC gating signals to said PC in accordance therewith,
   said gating pulses conveyed across said isolation barrier means being coupled to said switch means for operating said switch means to provide said PC gating signals having durations equal to the durations of said gating pulses.

2. The apparatus of claim 1 wherein
   said switch means comprises fast switch means and slow switch means,
   said source of gating pulses comprises a source of high speed gating pulses and a source of low speed gating pulses, and
   said isolation barrier means comprises first and second isolation barrier means for conveying said high speed and low speed gating pulses, respectively, from said low voltage section to said high voltage section,
   said high speed gating pulses conveyed across said first isolation barrier means being coupled to said fast switch means for operating said first switch means to provide said PC gating signals,
   said low speed gating pulses conveyed across said second isolation barrier means being coupled to said slow switch means for operating said slow switch means to provide said PC gating signals.

3. The apparatus of claim 1 further including driver means in said high voltage section for coupling said gating pulses conveyed across said isolation barrier means to said switch means for operating said switch means to provide said PC gating signals, and
   low voltage isolated power supply means having first and second outputs in said high voltage section, said first output providing operating potentials to said driver means, said low voltage isolated power supply means providing high voltage isolation between said low voltage section and said first and second outputs, said second output being coupled to one of said positive and negative outputs of said high voltage isolated power supply means so that said operating potentials for said driver means are referenced thereto.

4. The apparatus of claim 2 wherein said first isolation barrier means comprises a high voltage capacitor.

5. The apparatus of claim 2 wherein said second isolation barrier means comprises opto-isolator means.

6. The apparatus of claim 3 wherein said high voltage isolated power supply means and said low voltage isolated power supply means each comprise a DC/DC converter.

7. The apparatus of claim 3 wherein said second output of said low voltage isolated power supply means is coupled to said negative output of said high voltage isolated power supply means and said driver means is coupled to said negative output of said high voltage isolated power supply means so that said driver means operates with only low voltages thereacross.

8. The apparatus of claim 2 wherein
said positive potential at said positive output of said high voltage isolated power supply means is sufficiently positive to clear burned in images from said PC, and
said source of high speed gating pulses includes a source of PC repair pulses of a narrow width and low repetition rate so as to clear said burned in images.

9. The apparatus of claim 2 wherein said source of low speed gating pulses includes a source of DC potential to control continuous on operation of said image intensifier.

* * * * *